Figure 1:
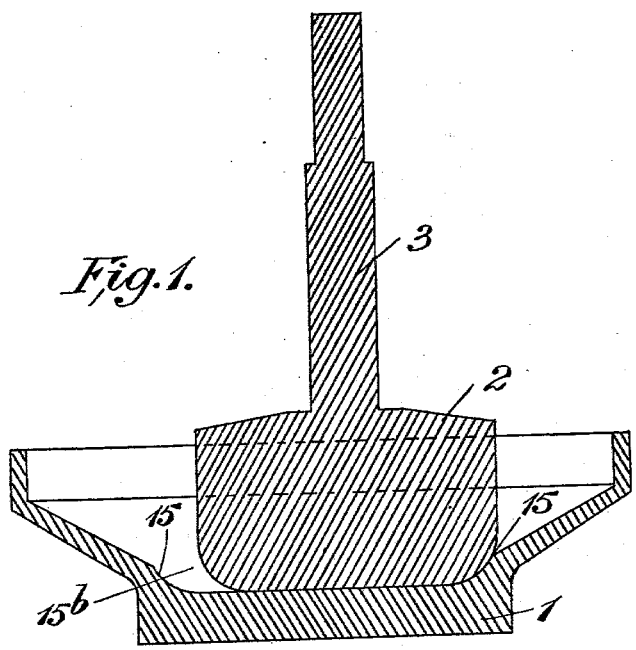

No. 745,416. PATENTED DEC. 1, 1903.
T. BREAKELL.
MORTAR AND MULLER FOR GRINDING, CRUSHING, AND MIXING ORES, CHEMICALS, &c.
APPLICATION FILED SEPT. 18, 1902.
NO MODEL. 4 SHEETS—SHEET 1.

Attest:
O. S. Middleton
Edw. L. Reed

Inventor:
Thomas Breakell,
by Ellis Spear
atty

No. 745,416. PATENTED DEC. 1, 1903.
T. BREAKELL.
MORTAR AND MULLER FOR GRINDING, CRUSHING, AND MIXING ORES, CHEMICALS, &c.
APPLICATION FILED SEPT. 18, 1902.
NO MODEL. 4 SHEETS—SHEET 2.

Attest:
C. S. Middleton
Edw. L. Reed.

Inventor,
Thomas Breakell
by Ellis Spear
atty.

No. 745,416. PATENTED DEC. 1, 1903.
T. BREAKELL.
MORTAR AND MULLER FOR GRINDING, CRUSHING, AND MIXING ORES, CHEMICALS, &c.
APPLICATION FILED SEPT. 18, 1902.
NO MODEL. 4 SHEETS—SHEET 3.
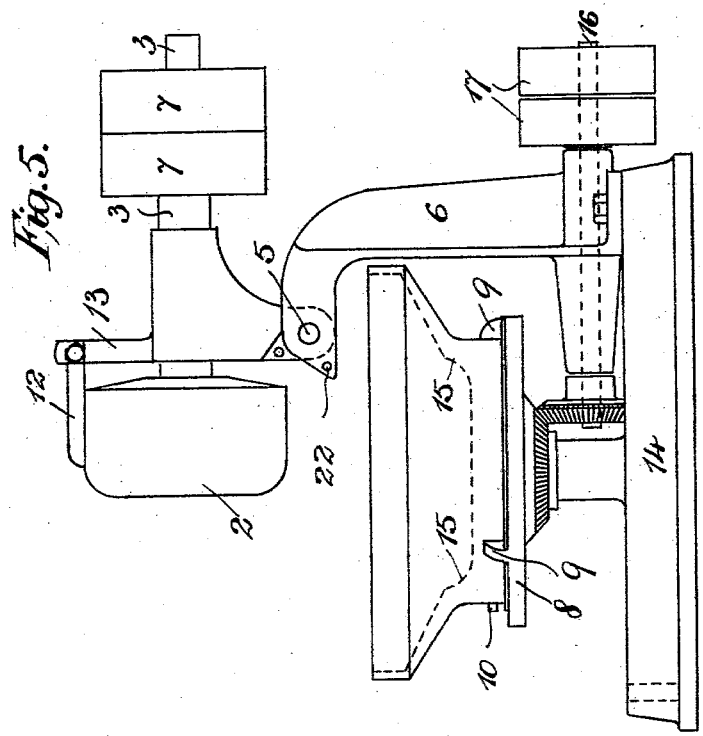
Inventor
Thomas Breakell No. 745,416. PATENTED DEC. 1, 1903.
T. BREAKELL.
MORTAR AND MULLER FOR GRINDING, CRUSHING, AND MIXING
ORES, CHEMICALS, &c.
APPLICATION FILED SEPT. 18, 1902.
NO MODEL. 4 SHEETS—SHEET 4.
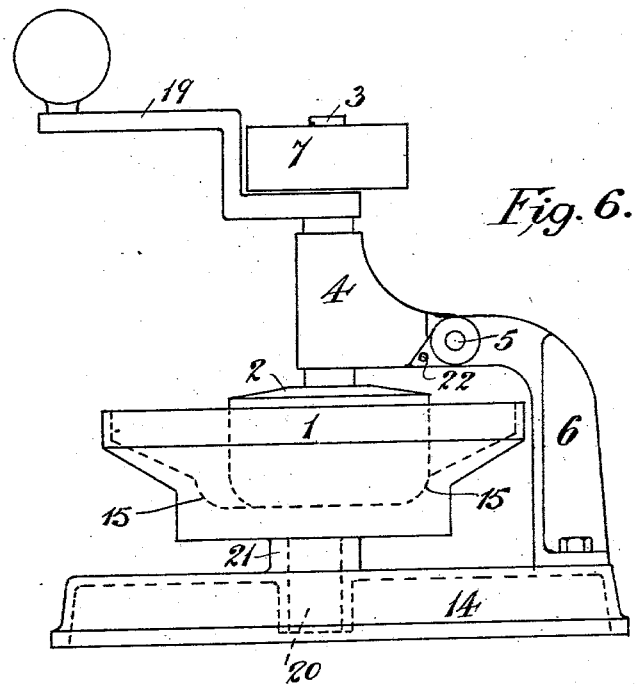
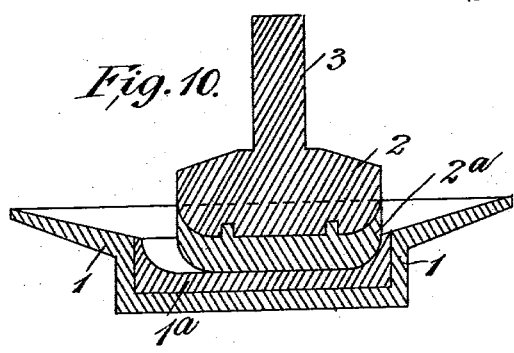
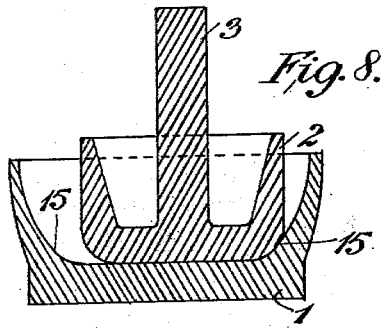
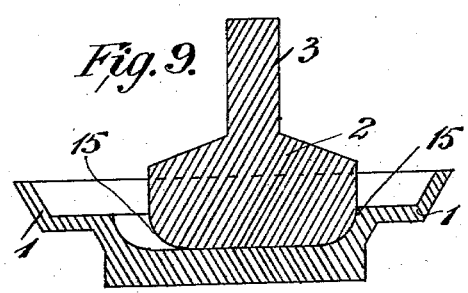
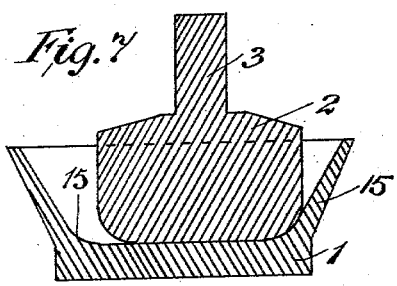
Attest:
C. Middleton
Edw. L. Reed
Inventor.
Thomas Breakell.
by Ellis Spear
atty.

No. 745,416. Patented December 1, 1903.

UNITED STATES PATENT OFFICE.

THOMAS BREAKELL, OF WIRKSWORTH, ENGLAND.

MORTAR AND MULLER FOR GRINDING, CRUSHING, AND MIXING ORES, CHEMICALS, &c.

SPECIFICATION forming part of Letters Patent No. 745,416, dated December 1, 1903.

Application filed September 18, 1902. Serial No. 123,929. (No model.)

*To all whom it may concern:*

Be it known that I, THOMAS BREAKELL, a subject of the King of Great Britain and Ireland, and a resident of Brassington Hall, Wirksworth, in the county of Derby, England, have invented a certain new and useful Mortar and Muller for Grinding, Crushing, and Mixing Ores, Chemicals, and other Substances, (for which I have made application for Letters Patent in Great Britain, No. 4,479, bearing date February 22, 1902,) of which the following is a specification.

This invention relates to that class of mixing, grinding, or levigating machinery or apparatus in which a pestle, muller, or the like is employed and to which motion is imparted, having an effect somewhat similar to that attained by a pestle when grinding, mixing, or levigating substances by hand.

The object of the invention is to provide a machine by which mixing, grinding, or levigating may be effected not only much more rapidly than attained by hand, but in a more efficient manner.

The invention consists, essentially, in eccentrically disposing a pestle or muller within a mortar, the diameter of the grinding-surface of the muller being at least half the diameter of the grinding-surface of the mortar, and then positively rotating either one or both of them.

The invention also consists in so mounting the shaft of the pestle or muller within its bearing that it is free to move or to be positively moved vertically in order to allow or attain a pounding action when such is desired.

The invention further consists in hinging or pivoting the bearing of the pestle-shaft in order that the pestle may be moved upwardly out of the mortar to facilitate cleaning of the apparatus or removal of the substance treated.

The invention still further consists in the combination of details of construction hereinafter described, rendering the machine effective in action.

Figure 2:
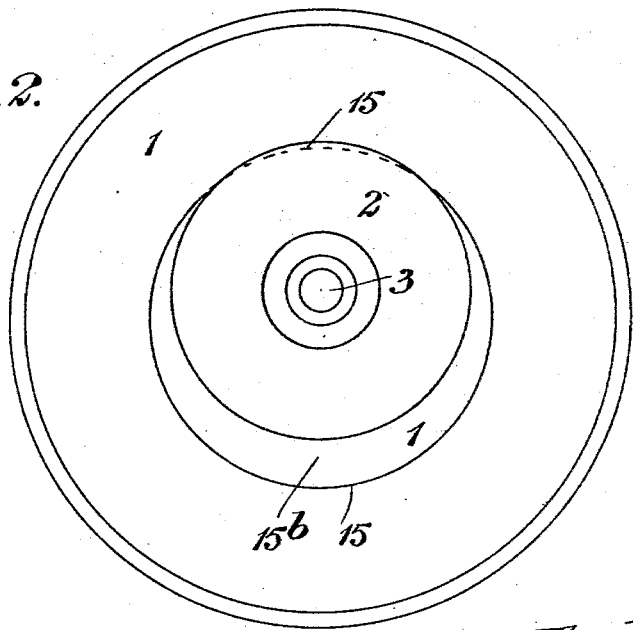
Figure 3:
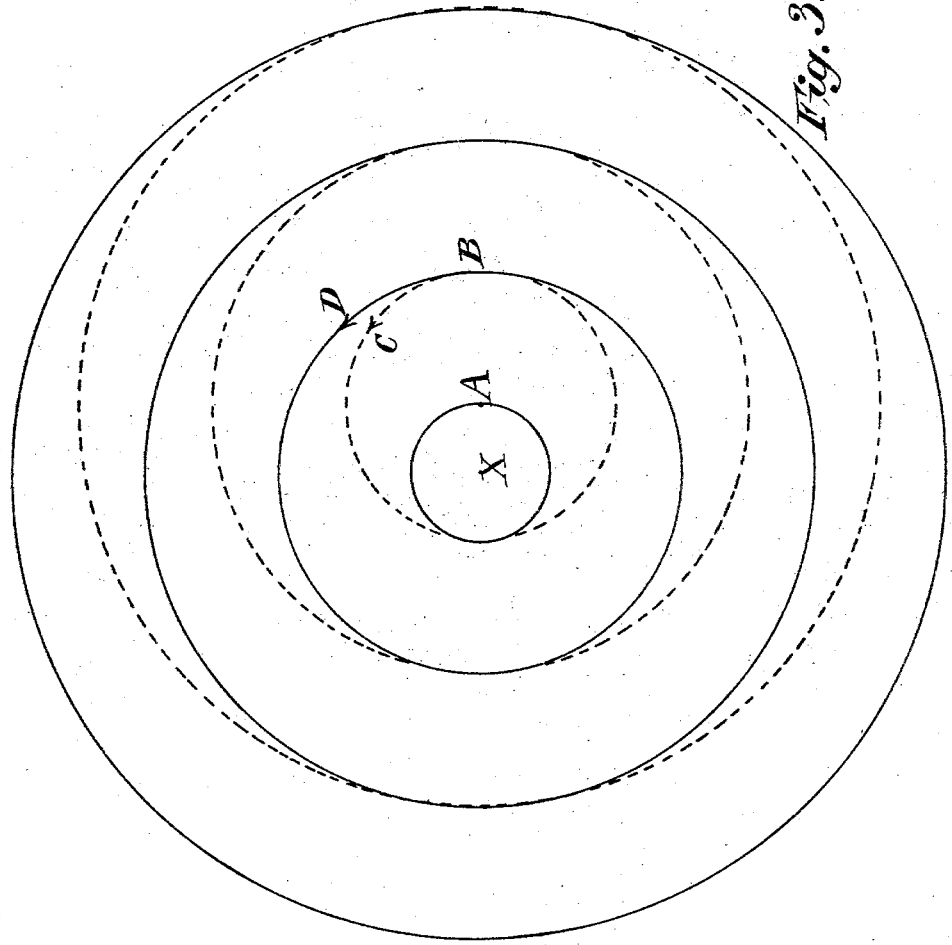

Referring to the accompanying drawings, Figures 1 and 2 are respectively sectional elevation and plan of a muller or pestle and mortar constructed and arranged according to one form of my invention. Fig. 3 is a diagram illustrating the grinding action or effect produced by the invention. Fig. 4 is a front elevation of a complete mill or apparatus constructed according to one form of the invention, in which the pan alone is positively rotated, the muller being only rotated by friction therewith. Fig. 5 is a similar view, but illustrating the muller moved into its inoperative position for cleaning. Fig. 6 is a front elevation of a complete mill constructed according to another form of the invention in which the muller is positively rotated, while the pan is rotated by friction therewith. Figs. 7, 8, 9, and 10 are sectional elevations illustrating various modified forms of mullers and mortars.

In carrying out the invention according to one form, as illustrated in Figs. 1 to 4, a muller or pestle 2 is eccentrically disposed within a pan or mortar 1, the muller and pan being of the form hereinafter fully described. The stem or shaft 3 of the muller is freely mounted, so as to slide and rotate within a bearing 4, which is hinged or pivoted at 5 to a bracket 6, bolted or otherwise secured to a base-plate 14, a pin 22 being provided to rigidly secure the bearing during operation. The stem 3 is formed with a collar or otherwise adapted to receive and sustain weights 7, by which the pressure of the muller upon the mortar may be adjusted as required, according to the nature of the material to be treated.

The pan or mortar is mounted upon a disk 8, being retained thereon by projections 9 and prevented from rotating relatively thereto by a pin 10. The disk 8 is formed with a stem 20, suitably mounted within a bearing 21 upon the base-plate 14 and positively rotated by any suitable means—such as bevel-gearing off a secondary shaft 16, provided with fast and loose pulleys 17. A scraper 18, carried by an arm or support 11, is provided to guide the material from the outer sides of the pan 1 toward and into the path of the muller 2, which is cleaned on its periphery by a scraper 12, carried off the bearing 4 by a lug 13. In operation the pan 1 is rotated by a belt on the fast pulley 17, the motion being transmitted through the shaft 16 and bevel-gearing. The muller is rotated by friction and is also free to rise vertically when encountering comparatively large lumps of material, which, however, are rapidly ground or levigated into a powder.

After the material in the pan 1 has been ground to the desired fineness the bearing 4 is swung upwardly about the pivot 5 and the pan 1 removed, the muller being then in a convenient position to be cleaned.

In the modified form of apparatus shown in Fig. 6 the muller is positively rotated by a handle 19, the mortar or pan being simply rotated by friction with the muller.

The form of muller and mortar may be varied considerably, according to the quality of the materal treated, it being essential, however, that the diameter of the grinding-surface of the muller should be half or more than half the diameter of the grinding-surface of the mortar or pan. In the example shown in Figs. 1 and 2 the muller is of cylindrical form, having a flat lower surface, the lower edge, however, being rounded off. The pan is formed with a flat bottom surface, bounded by a curved rim or side 15, corresponding approximately to the curved edge of the muller. Above the curved portion of the pan the latter is extended to any suitable form, but is preferably made of an inverted conical form, as shown in Figs. 1 to 7, the inclination being varied as desired, according to the nature of the material to be treated, or a curved extension, Fig. 8, or partly flat and conical extension, Fig. 9, may be employed. Both the muller and the mortar may be provided with removable grinding-surfaces 1ª 2ª, as shown in Fig. 10.

Whichever form of mortar and muller is adopted the muller is so disposed relatively to the mortar that its curved edge is adjacent to the correspondingly-curved side of the bottom of the mortar, as shown in the various Figs. 1 and 7 to 10. It is, however, not forced laterally against the curved portion of the mortar, but is simply pressed down onto the bottom of the pan.

The diameter of the muller may be anything greater than the radius, but less than the diameter of the grinding-surface of the pan so long as there is sufficient space left, as at 15ᵇ, Fig. 1, to allow the material treated to fall between the muller and the pan.

By the special arrangement of muller and mortar above described the material in the pan is constantly subjected to a rubbing action at one speed and in one direction on its upper surface and at a different speed in a different direction on its lower surface, and at the same time is subjected to the pressure of the weighted muller. This action will be fully understood by reference to the diagram in Fig. 3, wherein the full circles represent circles upon the pan or mortar, while the dotted represent the corresponding circles of contact on the muller. As the muller and pan are of unequal diameters the corresponding pairs of dotted and full circles will also be unequal, but, on the other hand, each pair of circles will travel at the same linear velocity. Therefore any particle of material between the muller and the pan will be subjected to one velocity on top in one direction due to the muller and to another velocity in a different direction due to the pan, and as it works its way outward these velocities rapidly increase. For instance, a particle at the point B is subjected on top to a velocity which may be represented by the radius AB in the direction of the arrow C, while it is subjected on its lower side to a velocity represented by the radius XB and in the direction of the arrow D. It will therefore be understood that the material under the above-described action will be rapidly and effectively ground or levigated.

Having thus described my invention, what I claim as new, and desire to secure by Letters Patent, is—

1. A grinding or levigating machine comprising a rotary pan or mortar having a flat bottom surface surrounded by an upwardly-projecting curved rim and a conical extension or outer rim, a rotary muller eccentrically mounted in said pan and provided with a flat bottom surface and curved lower edge adapted to correspond with the aforesaid curved rim in the pan and means for positively rotating the pan substantially as hereinbefore set forth.

2. A grinding or levigating machine comprising a rotary pan or mortar with means for operating it, a vertical shaft disposed above the mortar to one side of the center thereof, a pivoted bearing for said shaft, a bracket supporting said bearing and a muller mounted on the lower end of said shaft and of a diameter not less than half the diameter of the pan, substantially as described.

3. A grinding or levigating machine comprising a rotary pan or mortar, a rotary pestle or muller eccentrically mounted therein and provided with a vertically-disposed stem or shaft, a pivoted bearing for the said stem, a bracket for supporting such pivoted bearing, means for locking the pivoted bearing either in a lower operative position or in an elevated inoperative position and means for positively rotating the mortar or pan, substantially as hereinbefore set forth.

In witness whereof I have hereunto set my hand in presence of two witnesses.

THOS. BREAKELL.

Witnesses:
WILLIAM FAULKNER,
ELDON ALFRED KING.